United States Patent [19]
Andersson et al.

[11] Patent Number: 5,459,530
[45] Date of Patent: Oct. 17, 1995

[54] APPARATUS FOR MATCHING COLORS IN IMAGE SIGNALS

[75] Inventors: Russell L. Andersson, Manalapan; David C. Gibbon, Lincroft; Jakub Segen, Fair Haven, all of N.J.

[73] Assignee: AT&T IPM Corp., Coral Gables, Fla.

[21] Appl. No.: 355,723

[22] Filed: Dec. 14, 1994

[51] Int. Cl.$^6$ ............................. H04N 9/68; H04N 17/02
[52] U.S. Cl. ..................... 348/645; 348/179; 348/256
[58] Field of Search ............................. 348/29, 179, 223, 348/234, 256, 645, 646, 647, 648, 655, 649, 651, 652; 358/10, 27, 26, 518, 520; H04N 17/02, 9/68

[56] References Cited

U.S. PATENT DOCUMENTS

5,267,026  11/1993  Kawahara ........................... 348/223
5,337,083   8/1994  Murata ............................... 348/256

*Primary Examiner*—James J. Groody
*Assistant Examiner*—Sherrie Hsia
*Attorney, Agent, or Firm*—Mark K. Young

[57] ABSTRACT

An inexpensive, yet robust color matcher is achieved by an apparatus which includes a compare device coupled to receive, as a first input, an input signal representing a combination of a luminance component Y and a chrominance component, and further coupled to receive as a second input, a threshold T, for comparing the input signal to the threshold T and outputting a color match signal if the input signal falls within a range defined by T and −T; and a threshold supply device coupled to the second input for supplying the threshold T, wherein the threshold T is a function of Y and at least two adjustable parameters.

3 Claims, 6 Drawing Sheets

APPARATUS FOR MATCHING COLORS IN IMAGE SIGNALS

TECHNICAL FIELD

This invention relates to color matching. More particularly, this invention relates to an apparatus for matching colors in image signals.

BACKGROUND OF THE INVENTION

Machine vision devices are in common use today in a wide variety of commercial and industrial applications due, in large part, to the added capabilities such devices can provide. Color matching is one important aspect of machine vision which is used to determine whether an image viewed by the machine contains a color corresponding to a to predetermined color to be matched. Color matching may be useful, for example, in process control in manufacturing where the increased accuracy and reliability of such schemes over human-supervised process control may provide significant economic benefit. It would be desirable to increase the availability of color matchers to more widely obtain the benefits such machines provide. Accordingly, an inexpensive yet robust color matcher is sought.

SUMMARY OF THE INVENTION

An inexpensive, yet robust color matcher is achieved, in accordance with the invention, by an apparatus which includes a compare device coupled to receive, as a first input, an input signal representing a combination of a luminance component Y and a chrominance component, and further coupled to receive as a second input, a threshold T, for comparing the input signal to the threshold T and outputting a color match signal if the input signal falls within a range defined by T and −T; and a threshold supply device coupled to the second input for supplying the threshold T, wherein the threshold T is a function of Y and at least two adjustable parameters.

DETAILED DESCRIPTION

Figure 1:
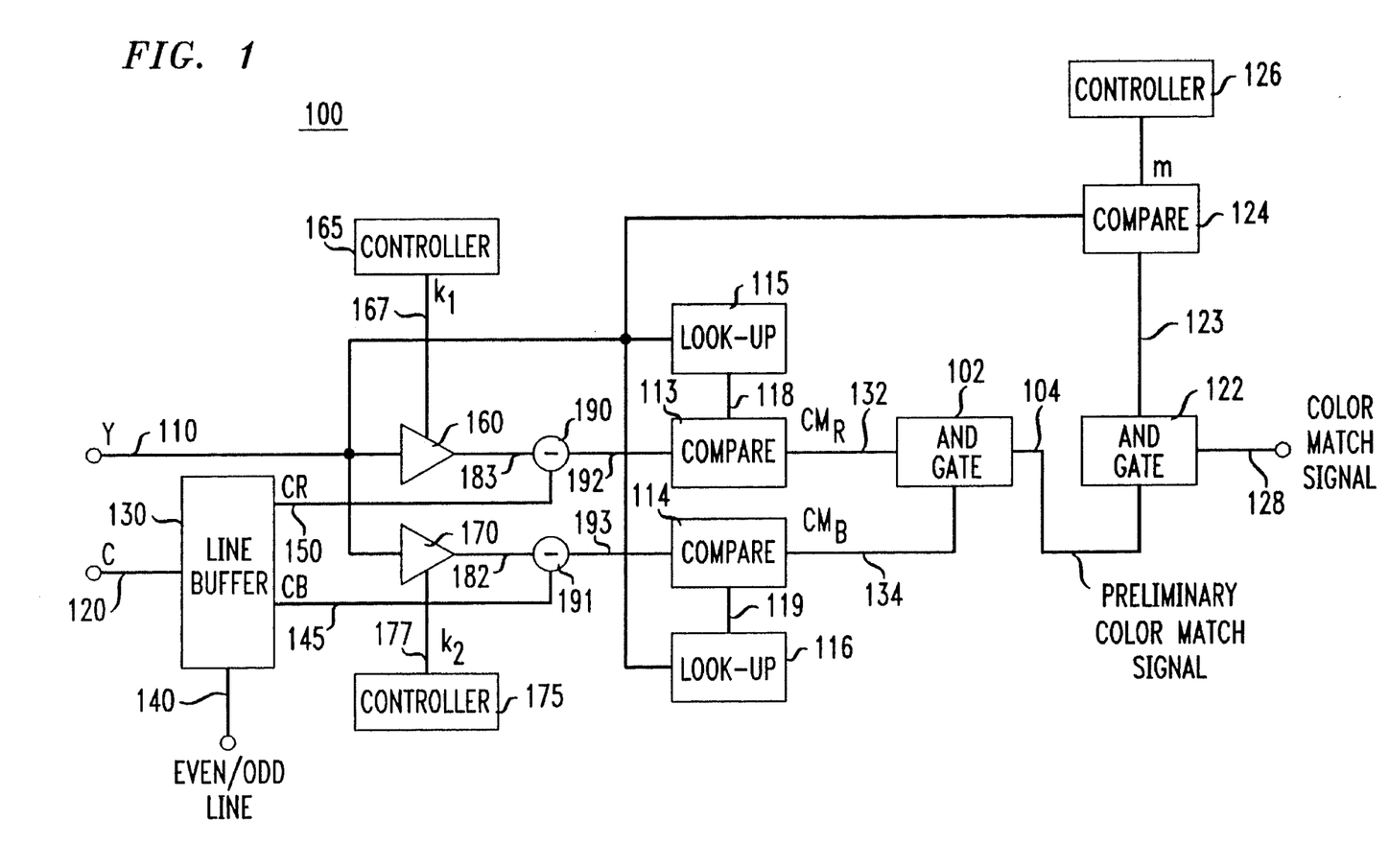
FIG. 1 is a simplified block diagram of an illustrative example of a color matcher, in accordance with the invention.

FIG. 1 is a simplified block diagram of an illustrative example of a color matcher 100, in accordance with the invention. As shown, color matcher 100 includes a luminance signal Y input on line 110, and a chrominance signal C on line 120. Typically, chrominance signal C alternates, on a line basis, between color difference signals $C_R$ and $C_B$.

Figure 2:
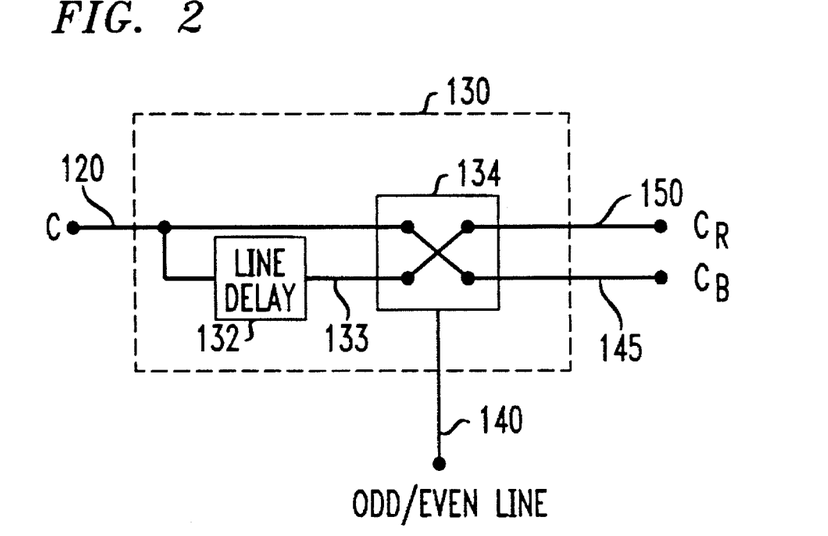
FIGS. 2 and 3 shows states of operation for a switch used in the color matcher shown in FIG. 1, in accordance with the invention.
Figure 3:
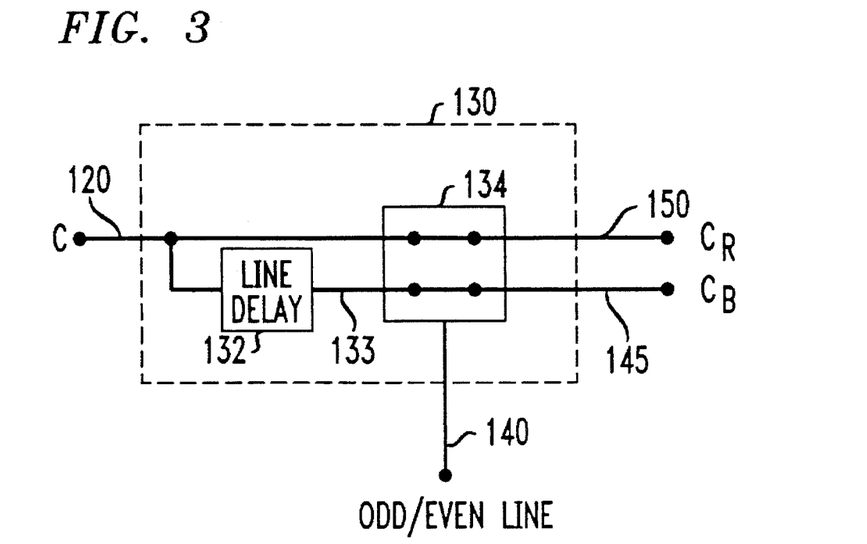

These signals Y and C could be received from a photosensitive device (not shown), for example, a charge-coupled device ("CCD"). Luminance signal Y and chrominance signal C when combined typically are utilized in the representation of images, for example, video images. Chrominance signal C is coupled, via line 120, to chrominance line buffer 130. An even/odd line control signal received from a timing circuit which controls the photosensitive device is input on line 140 to chrominance line buffer 130. Chrominance line buffer 130 advantageously provides for simultaneous output of color difference signals $C_R$ and $C_B$. Those skilled in the art will recognize that color difference signal $C_R$ is the difference between the red component and the luminance component of a color to be matched. Color difference signal $C_B$ is the difference between the blue component and the luminance component of a color to be matched. Referring to FIGS. 2 and 3, chrominance line buffer 130 includes line delay 132 and switch 134. Switch 134 receives two input signals: a current chrominance signal C on line 120 and a delayed chrominance signal C on line 133 from line delay 132. Line buffer 130 stores representations of chrominance values corresponding to a line of an image. Accordingly, if a digital implementation is desired in some applications of the invention, line buffer may be, in this illustrative example, configured to be an 640×8 bit digital storage device, assuming an image resolution of 640 pixels. Such devices are well known in the art, and include for example, random-access memory, first-in/first-out memory, and others. Switch 134 switches between two states in response to the odd-even control signal input on line 140. In the first state, shown in FIG. 2, switch 134 couples the current chrominance signal C on line 120 to the $C_B$ output on line 145, and couples the delayed chrominance signal C value on line 133 to the $C_R$ output on line 150. In the second state, shown in FIG. 3, switch 134 couples the current chrominance signal C to the $C_R$ output on line 150, and couples the delayed chrominance signal C to the $C_B$ output on line 145. Chrominance line buffer 130 thus outputs, in accordance with the principles of the invention, color difference signals $C_R$ and $C_B$ simultaneously. Those skilled in the art will appreciate that such a simultaneous color difference signal output could also be achieved if the photosensitive device used in a particular application of the invention outputs such a signal. For example, it is known that a NTSC composite video device, such as a camera or videotape recorder, simultaneously outputs Y, $C_R$, $C_B$. Alternatively, an RGB signal source could also be utilized, in which case luminance signal Y is derived from the RGB signal.

Figure 4:
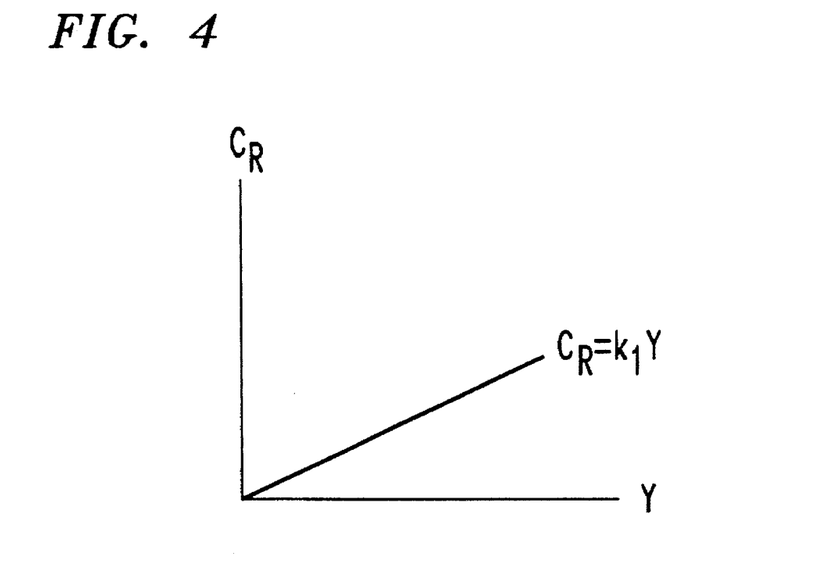
FIGS. 4 and 5 illustrate $k_1$ and $k_2$ values on plots of luminance signal Y versus chrominance signal C which are used to illustrate aspects of the invention.
Figure 5:
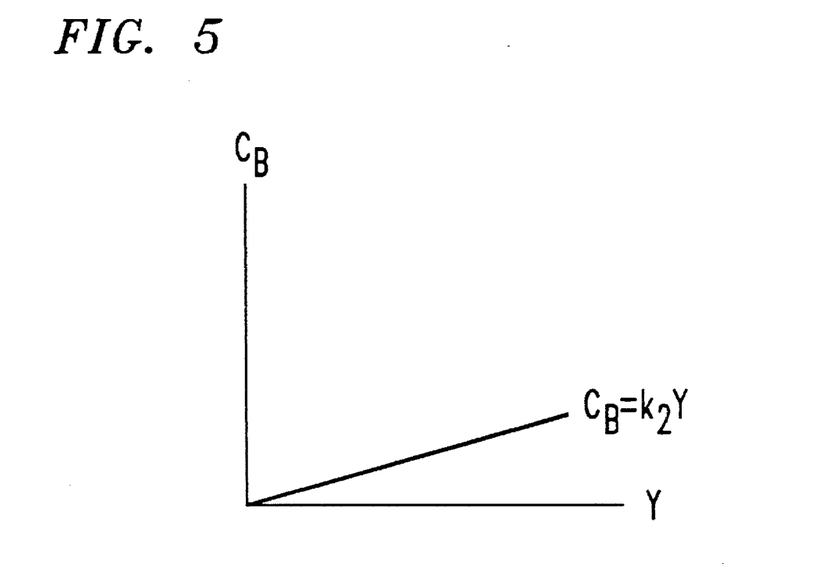

Referring back to FIG. 1, luminance signal Y is simultaneously received by multipliers 160 and 170, as shown. Luminance signal Y is scaled in multiplier 160 by a predetermined value $k_1$ received from controller 165 via line 167 and output from multiplier 160 on line 183. Luminance signal Y is also scaled by a predetermined value $k_2$ received from controller 175 via line 177 and output from multiplier 170 on line 182. It is contemplated that multipliers 160 and 170 may be analog or digital multipliers. Values $k_1$ and $k_2$ are used to define the color to be matched, and are represented, for example, as the slope of the locus of points which correspond to the predetermined color to be matched in the Y-$C_R$ and Y-$C_B$ planes, respectively. These are shown in FIGS. 4 and 5, respectively. Controllers 165 and 175 could be, for example, programmable digital registers if multipliers 160 and 170 are selected to be digital multipliers, or potentiometers or other analog circuits if multipliers 169 and 170 are selected to be analog multipliers. Referring back to FIG. 1, the scaled luminance Y signal on line 183 is received by subtractor 190. Subtractor 190 also receives the $C_R$ value on line 150 and forms a preliminary $C_R$ match signal, which in this illustrative example is an 8-bit value, that is output on line 192. However, it is intended that $C_R$ match signal may have other than 8 bits, or may be an analog signal. The preliminary $C_R$ match signal represents the difference between the $C_R$ component of the input color as compared to the predetermined color to be matched. Similarly, subtractor 191 outputs, on line 193, the preliminary $C_B$ match signal which represents the difference between the $C_B$ component of the input color as compared to the predetermined color to be matched in response to signals input on lines 182 and 145. In this illustrative example, the preliminary $C_B$ match signal is an 8-bit value. The preliminary C match signals output from subtractors 190 and 191 on lines 192 and 193 are received by compare devices 113 and 114, respectively. Compare devices 113 and 114 perform the threshold functions T=f(Y) which define a one-bit CM color match signal according to:

$$CM_R = \begin{cases} 1; |k_1Y - C_R| < f_R(Y) \\ 0; |k_1Y - C_R| \geq f_R(Y) \end{cases} \quad (1)$$

and $$CM_B = \begin{cases} 1; |k_2Y - C_B| < f_B(Y) \\ 0; |k_2Y - C_B| \geq f_B(Y) \end{cases} \quad (2)$$

respectively. It is evident that the left-hand sides of equations (1) and (2) are input to compare devices 113 and 114 on lines 192 and 193, respectively, where the absolute value functions are performed, for example, by compare devices 113 and 114. The right-hand sides of equations (1) and (2) are supplied to compare devices 113 and 114 by threshold supply devices, which in this illustrative example, are look-up tables 115 and 116, on lines 118 and 119, respectively. Alternatively, the threshold functions T=f(Y) may be supplied by threshold supply devices including function generation circuitry, for example a multiplier. Such function generation circuitry is known in the art. Look-up tables 115 and 116 may be loaded with values supplied by controllers in a similar manner as that utilized by controllers 165 and 175 above. In this illustrative example, look-up tables 115 and 116 are reduced precision look-up tables. Specifically, luminance signal Y is quantized to 256 values, using eight bits. The reduced precision look-up tables 115 and 116 only use 16 luminance signal Y values. The most significant four bits of the quantized luminance signal Y, forming the reduced precision luminance signal Y values, are input to look-up tables 115 and 116. The 16 luminance signal Y values are mapped to 16 eight-bit threshold values which are output from look-up tables 115 and 116. An exemplary look-up is shown in Table 1 below.

TABLE 1

| Y | YQ | T |
|---|----|---|
| 0 | 0 | 10 |
| 15 | 1 | 17 |
| 31 | 2 | 25 |
| 47 | 3 | 33 |
| 63 | 4 | 41 |
| 79 | 5 | 49 |
| 95 | 6 | 57 |
| 111 | 7 | 65 |

TABLE 1-continued

| Y | YQ | T |
|---|----|---|
| 127 | 8 | 73 |
| 143 | 9 | 81 |
| 159 | 10 | 89 |
| 175 | 11 | 97 |
| 191 | 12 | 105 |
| 207 | 13 | 113 |
| 239 | 14 | 129 |
| 255 | 15 | 137 |

Table 1 has three columns. The first column shows luminance signal Y values in the range from 0 to 255. The second column, YQ, shows the reduced precision luminance signal Y values. The third column, T, shows the eight-bit threshold values. The values in the T column were derived using the following relationship:

$$T = f(Y) = \alpha Y_Q + \beta \quad (3)$$

where, in this illustrative example, $Y_Q = \lfloor Y/16 \rfloor$, $\beta = 10$ and or $\alpha = 0.5$. It is intended, however, that $\alpha$ and $\beta$ are adjustable according to the specific requirements of a particular application. Thus, those skilled in the art will recognize that T is a linear function of Y and two parameters in equation (3). However, it may be desirable in some applications of the invention, as discussed below, to utilize a non-linear function, a piecewise linear function, or a constant function where, for example, $\alpha$ is adjusted to be substantially equal to zero in equation (3). Regardless of which particular function is chosen it is again emphasized that the threshold T may be provided by threshold supply devices, including look-up tables 115 and 116, that is any function of Y and at least two adjustable parameters. Advantageously, if a constant function is utilized then look-up tables 115 and 116 may be deleted. In this illustrative example a single exemplary look-up table is shown, however, it is intended that different tables may be utilized by look-up tables 115 and 116. This may be desirable, for example, because one chrominance component may have a reduced signal to noise ratio as compared to the other. Accordingly, for example, a different value for $\alpha$ may be selected for each chrominance component, $C_R$ or $C_B$. Similarly, a different value for $\beta$ may be selected for each chrominance component, $C_R$ or $C_B$. It is further noted that in some applications of the invention, it may be desirable for tables 115 and 116 to be full precision look-up tables. However, in accordance with the principles of the invention, the reduced precision look-up tables 115 and 116 described above are advantageously implemented with less circuitry than either full precision look-up tables or direct implementation of equation (3) in hardware, with a concomitant reduction in cost.

Referring back to FIG. 1, as noted above, compare device 113 outputs a one-bit binary CM color match signal, $CM_R$, on line 132. Compare device 114 outputs a one-bit binary CM match signal, $CM_B$, on line 134. These match signals represent the results of the application of equations (1) and (2), and are received by AND gate 102. AND gate 102 performs a logical AND function and the resultant one-bit binary preliminary color-match signal is output on line 104. The preliminary color-match signal is received by AND gate 122 as a first input. The second input from line 123 is output from compare device 124. Compare device 124 performs the following function:

$$Y_m = \begin{cases} 1; Y > m \\ 0; Y \leq m \end{cases} \quad (4)$$

where $Y_m$ represents whether luminance signal Y values are above a minimum magnitude m. The minimum magnitude m is provided by controller 126 such that dark image areas in the video image input to color matcher 100 are ignored. Controller 126 may be similar, for example, in form and operation to controllers 165 and 175. It is contemplated that all controllers discussed to this point may be incorporated, in whole or in part, into a master controller, for example, a computer. It is emphasized that the invention may be successfully practiced, in some applications, without using the minimum magnitude m, particularly when utilizing a full precision look-up table, for example. Thus minimum magnitude m is optionally used. The resultant one-bit binary output signal on line 128 is a color match signal, where a "1" is output to indicate a match between the input and the color to be matched, and a "0" is output to indicate no such match. Thus, for example, if the luminance signal Y and chrominance signal C input to color matcher 100 represent pixels in an image, then color matcher 100 outputs a color match signal on a pixel-by-pixel basis.

Figure 6:
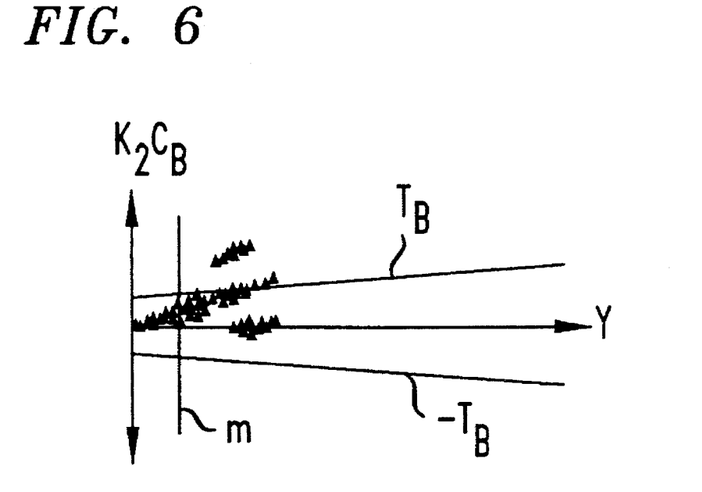
FIGS. 6 and 7 illustrate image data on plots of luminance signal Y versus chrominance signal C which are used to illustrate aspects of the invention.
Figure 7:
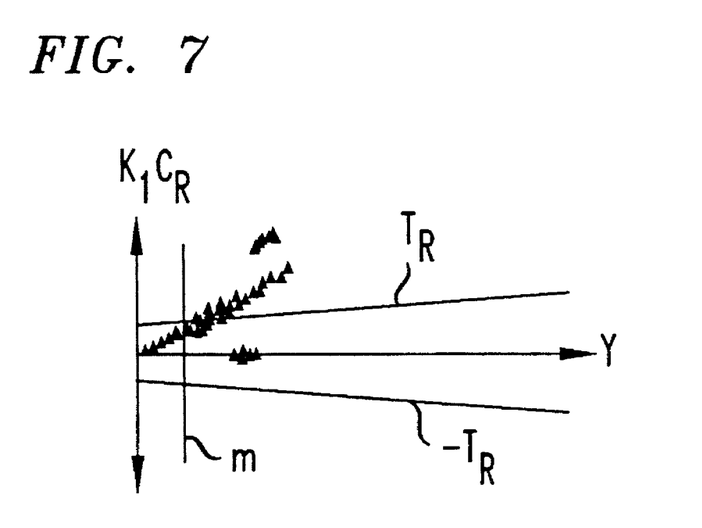

FIGS. 6 and 7 are plots of luminance signal Y versus scaled chrominance signal C which are useful in illustrating the principles of the invention. FIG. 6 shows $C_B$ scaled by $k_2$ on the y-axis, and luminance signal Y on the x-axis. The minimum magnitude m is represented by the vertical line parallel to the y-axis as shown. Equation (3), as plotted in FIG. 6, is represented by a series of line segments as a result of the reduced precision look-up table utilized in this illustrative example, as discussed above. Image data is also shown in FIG. 6. The cluster of data bounded by $T_B$ and $-T_B$, as shown, indicate those points in the image whose $C_B$ component matches that of the predetermined color. Similarly, in FIG. 7, the cluster of data bounded by $T_R$ and $-T_R$ indicate those points in the image whose $C_R$ component matches that of the predetermined color. Advantageously, the T boundaries may be adjusted up or down, in accordance with the principles of the invention, to vary the selectivity of color matcher 100, for example by adjusting the $\alpha$ and $\beta$ parameters in equation (3). That is, differences in image data values resulting from variations in object color, illumination, or noise, may be readily accommodated. Accordingly, a robust color matcher is achieved herein. As shown in FIGS. 6 and 7, the determination of a color match is made independent of the intensity of the image data. However, it is intended that the practice of the invention may include additional selectivity based on intensity. This may be realized by forcing T values to zero using a non-linear T function, or by utilizing a maximum magnitude M which may be implemented in a similar manner as the previously described minimum magnitude m. It is emphasized that this additional selectivity is optionally utilized, but may be desirable in certain applications of the invention.

Figure 8:
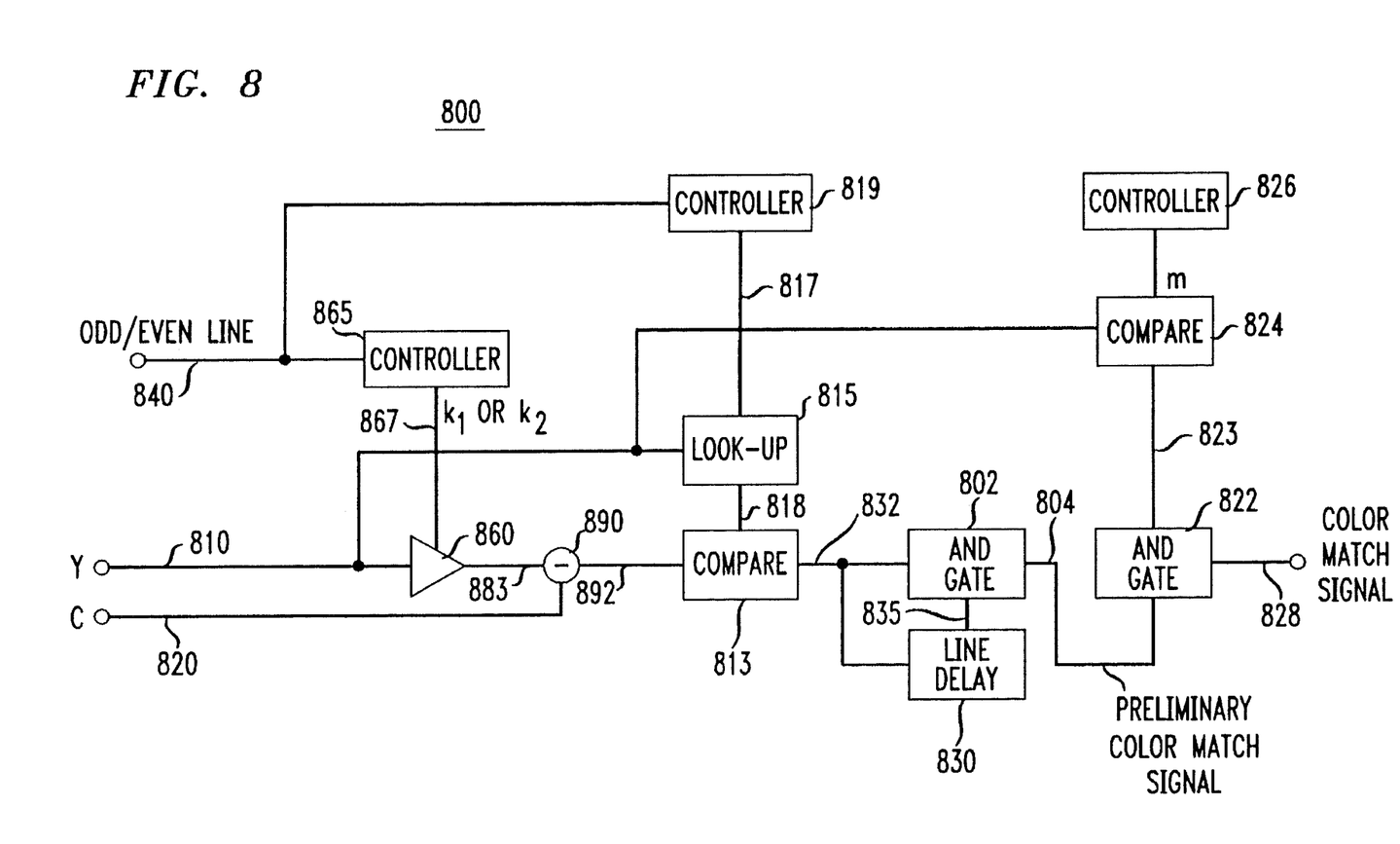
FIG. 8 is a simplified block diagram of a second illustrative example of a color match in accordance with the invention.

FIG. 8 is a simplified block diagram of a second illustrative example of a color matcher 800, in accordance with the invention. As shown, color matcher 800 includes a luminance signal Y input on line 810, and a chrominance signal C on line 820. Typically, chrominance signal C alternates, on a line basis, between color difference signals $C_R$ and $C_B$. These signals Y and C could be received from a photosensitive device (not shown), for example, a charge-coupled device ("CCD"). As with the previous illustrative example, luminance signal Y and chrominance signal C when combined typically are utilized in the representation of images, for example, video images.

Luminance signal Y is received by multiplier 860. Luminance signal Y is scaled in multiplier 860 by a predetermined value k received from controller 865 via line 867 and output from multiplier 860 on line 883. Controller 865 may be similar in form and operation to controllers 126, 165, and 175 in FIG. 1. As shown in FIG. 8, an even/odd line control signal received from a timing circuit which controls the photosensitive device is input on line 840 to controller 865. In accordance with the principles of the invention, the value k alternates between $k_1$ and $k_2$ in response to the even/odd line control signal. Values $k_1$ and $k_2$ are used to define the color to be matched, and may be the same as those shown in the previous illustrative example. The scaled luminance Y signal on line 883 is received by subtractor 890. Subtractor 890 also receives the C value on line 820 and forms a preliminary CM color match signal which is output on line 892. The preliminary CM color match signal alternatively represents the difference between the $C_R$ component of the input color as compared to the predetermined color to be matched, and the $C_B$ component of the input color as compared to the predetermined color to be matched. For example, when an even line is received by color matcher 800, the preliminary CM match signal is the preliminary $CM_R$ match signal. Similarly, when an odd line is received by color matcher 800, the preliminary CM match signal is the preliminary $CM_B$ match signal.

In accordance with the principles of the invention, compare device 813 alternates between performing two threshold functions T=f(Y) which define a one-bit binary CM color match signal:

$$CM = \begin{cases} 1; |kY - C| < f(Y) \\ 0; |kY - C| \geq f(Y) \end{cases} \quad (5)$$

where k alternates between $k_1$ and $k_2$ in response to even/odd line control signal on line 840; f alternates between $f_R$ and $f_B$ in response to even/odd line control signal on line 840; and, C alternates between $C_R$ and $C_B$ in response to even/odd line control signal on line 840. The threshold functions T=f(Y) may be provided by a threshold supply device, which, in this illustrative example is look-up table 815, as shown. Alternatively, threshold functions T=f(Y) may be supplied from threshold supply devices including function generation circuitry, for example a multiplier. As with the previous illustrative example, the threshold T is any function of Y and at least two adjustable parameters. In this illustrative example, look-up tables 815 is a reduced precision look-up tables. Specifically, luminance signal Y is quantized to 256 values, using eight bits. The reduced precision look-up tables 815 only use 16 luminance signal Y values. The most significant four bits of the quantized luminance signal Y, forming the reduced precision luminance signal Y values, are input to look-up table 815. The 16 luminance signal Y values are mapped to 16 eight-bit threshold values which are output from look-up table 815. Table 1 above may also be appropriately used in this illustrative example of the invention. In accordance with the principles of the invention, the values representing the functions, f, in equation (5) above, from look-up table 815 received by compare device 813 on line 818 selectively alternate between $f_R$ and $f_B$, in response to a control signal on line 817 from controller 819. Controller 819 sends control signal on line 817, which may be a one-bit binary control signal, in response to the even/odd line control signal input to controller 819 on line 840. Alternatively, controller 819 may provide the look-up table values on line 817 to look-up table 815 in response to the even/odd line control signal input to controller 819 on line 840. Moreover, if the operation of look-up table 815 is performed by function generation circuitry, as discussed above, controller 8 19 may program such circuitry, by loading multiplier coefficients, for example. It is also intended that the functions of controller 8 19 may be incorporated directly into look-up table 815.

The output of compare device 813 is a one-bit binary CM match signal on line 832 is received by AND gate 802 and simultaneously received by line buffer 830. AND gate 802 may be similar in form and operation to AND gate 102 in FIG. 1 above. In this illustrative example, line buffer 830 is preferably a 640×1 bit line buffer which, advantageously, reduces the memory requirements of color matcher 800 by a factor of eight over the previous illustrative example shown in FIG. 1. In accordance with the principles of the invention, for color matcher 800 to indicate a color match two conditions must be satisfied: the current chrominance signal C must match the predetermined color and; the chrominance signal C from the previous image line must also match. AND gate 802 performs the logical AND function to determine whether these two conditions are, in fact, satisfied. The first input to AND gate 802 is the CM match signal corresponding to the current chrominance signal C on line 832, and the second input is the one-bit binary CM match signal corresponding to the chrominance signal C from the previous image line, provided by line buffer 830 on line 835. The output of AND gate 802 is a preliminary color match signal. AND gate. 802 outputs the resultant one-bit binary preliminary color-match signal line 804.

The preliminary color-match signal is received by AND gate 822 as a first input. The second input from line 823 is output from compare device 824. Compare device 824 performs the following function defined by equation (4) above. In a similar manner as shown in FIG. 1, the minimum magnitude m is provided by controller 826 such that dark image areas in the video image input to color matcher 800 are ignored. As above, it is contemplated that all the controllers utilized in this illustrative example may be incorporated, in whole or in pan, into a master controller, for example, a computer. The resultant one-bit binary output signal on line 828 is a color match signal, where a "1" is output to indicate a match between the input and the color to be matched, and a "0" is output to indicate no such match. As above, for example, if the luminance signal Y and chrominance signal C input to color matcher 800 represent pixels in an image, then color matcher 800 outputs a color match signal on a pixel-by-pixel basis. It is evident that color matcher 800 utilizes circuitry than color matcher 100 (FIG. 1) which advantageously provides even further cost savings.

Figure 9:
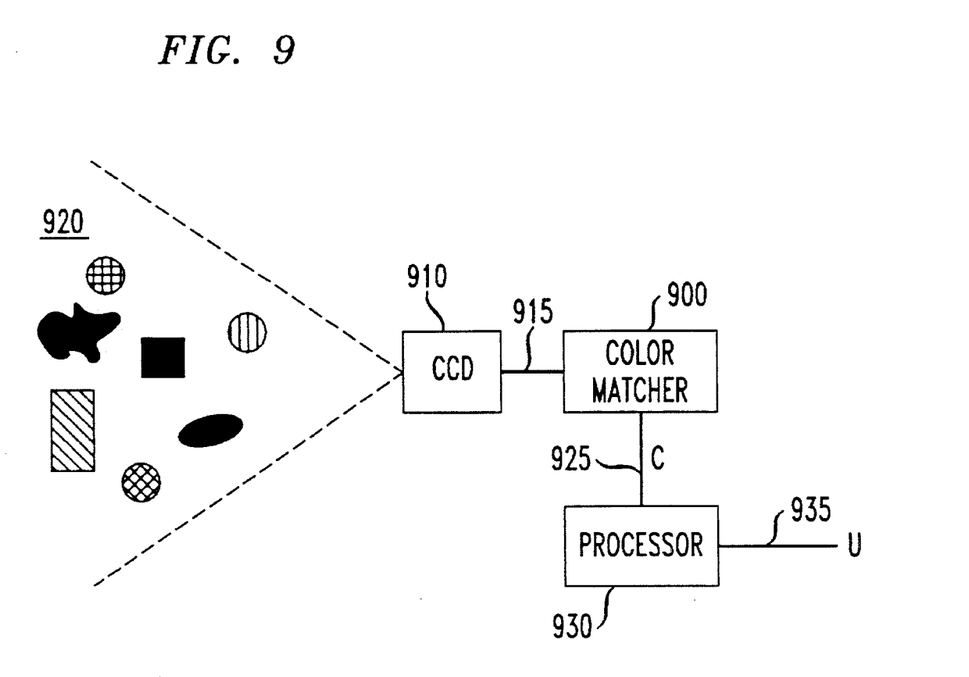
FIG. 9 is a simplified block diagram of this illustrative application of the invention.

The following discussion illustrates a specific application which is useful in highlighting certain features and advantages of the invention. In this illustrative application of the invention, the color matcher 100 or 800 shown in FIGS. 1 and 8, respectively, may be applied to colored object recognition. FIG. 9 is a simplified block diagram of this illustrative application of the invention. Shown are a photosensitive device, which in this example is CCD 910; color matcher 900; and, processor 930, which are serially coupled, respectively, as shown. Color matcher 900 may be either color matcher 100 or 800, as described above. Processor 930 may be any general purpose processor of a type that is known in the art, for example, a computer. CCD 910 views a field of view containing a plurality of colored objects 920. Colored objects 920 may have different colors and shapes. Image data from CCD 910 is received via line 915 by color matcher 900 which generates a one-bit binary color match signal C, as described above, on line 925 to processor 930. Computer 930, in response to the one-bit color match signal C, generates an output signal U on line 935, using an image processing method that is appropriate for a desired application. For example, computer 930 may be coupled to a video game to provide control input to the game. One appropriate image processing method applicable to such an application is described in U.S. patent application Ser. No. 08/178,210, the disclosure of which is incorporated by reference herein. Using a conventional image processing method known in the art, computer 930 may alternatively be coupled to an automated inspection device, for example, to determine whether the color of certain manufactured goods is within a desired tolerance.

It will be understood that the particular techniques described above are only illustrative of the principles of the present invention, and that various modifications could be made by those skilled in the an without departing from the scope and spirit of the present invention, which is limited only by the claims that follow.

We claim:

1. An apparatus, comprising:

a compare device coupled to receive, as a first input, an input signal representing a combination of a luminance component Y and a chrominance component, and further coupled to receive as a second input, a threshold T, for comparing said input signal to said threshold T and outputting a color match signal if said input signal falls within a range defined by T and −T; and a threshold supply device coupled to said second input for supplying said threshold T, wherein said threshold T is a function of said luminance component Y and at least two adjustable parameters.

2. The apparatus of claim 1 wherein said threshold T is defined by $$T = \alpha Y + \beta,$$

and $$\beta \neq 0$$

and $\alpha$ is a first one of said at least two adjustable parameters and $\beta$ is a second one of said at least two adjustable parameters.

3. A color matcher, comprising:

a first multiplier coupled to receive a luminance signal as an input for scaling said luminance signal by a first factor $k_1$;

a second multiplier coupled to receive said luminance signal as an input for scaling said luminance signal by a second factor $k_2$;

a first subtractor coupled to receive, as a first input said scaled luminance signal from said first multiplier; and coupled to receive, as a second input, a first chrominance signal, for determining a first difference between said first scaled luminance signal and said first chrominance signal;

a second subtractor coupled to receive, as a first input said scaled luminance signal from said second multiplier; and coupled to receive, as a second input, a second chrominance signal, for determining a second difference between said second scaled luminance signal and said second chrominance signal;

a first compare device coupled to receive, as a first input, said first difference, and coupled to receive as a second input, a first threshold, for comparing said first difference to said first threshold and outputting a first color match signal;

a second compare device coupled to receive, as a first input, said second difference, and coupled to receive as a second input, a second threshold, for comparing said second difference to said second threshold and outputting a second color match signal; and an AND gate coupled to receive, as a first input, said first color match signal, and coupled to receive, as a second input, said second color match signal, for performing a logical AND function between said first and said second color match signals.

* * * * *